United States Patent [19]

Frilette

[11] Patent Number: 4,654,082

[45] Date of Patent: Mar. 31, 1987

[54] ANTIOXIDANT GRAVURE PRINTING INKS AND PROCESS OF EMPLOYING THE SAME

[75] Inventor: Vincent J. Frilette, Fairfax, Va.

[73] Assignee: Mobil Oil Corporation, New York, N.Y.

[21] Appl. No.: 721,483

[22] Filed: Apr. 8, 1985

Related U.S. Application Data

[63] Continuation of Ser. No. 544,978, Oct. 24, 1983, abandoned, which is a continuation-in-part of Ser. No. 238,284, Feb. 3, 1981, abandoned.

[51] Int. Cl.$^4$ .............................................. C09D 11/08
[52] U.S. Cl. ....................................... 106/30; 106/23; 524/187; 524/270
[58] Field of Search ....................... 106/25, 26, 30, 31, 106/32, 23, 29; 524/77, 187, 270, 323

[56] References Cited

U.S. PATENT DOCUMENTS

| | | | |
|---|---|---|---|
| 3,375,120 | 3/1968 | Remer | 106/27 |
| 4,077,727 | 3/1978 | Kramer et al. | 106/23 |
| 4,289,678 | 9/1981 | Calder et al. | 106/30 |

OTHER PUBLICATIONS

Husen, W., American Ink Maker, vol. XXX, No. 6, "Synthetic Resin . . . Up-to-Date," 1952, pp. 63–73.

*Primary Examiner*—Amelia B. Yarbrough
*Attorney, Agent, or Firm*—Alexander J. McKillop; Michael G. Gilman; Malcolm D. Keen

[57] ABSTRACT

A gravure ink composition and method of using the same for printing by the gravure process are disclosed. The composition comprises a pigment, a vehicle composed basically of a resin and solvent, and a small amount, e.g., 0.0002 to 1 wt. %, of an antioxidant. The antioxidant serves as a means for reducing the tendency of gravure ink formulations to streak during the printing process, particularly during high-speed printing operations. A preferred gravure ink formulation contains a small amount of an antioxidant such as 2,6-di-tert-butyl-4-methylphenol or 4,4'-bis(1,1,3,3-tetramethylbutylphenyl)amine.

12 Claims, No Drawings

ANTIOXIDANT GRAVURE PRINTING INKS AND PROCESS OF EMPLOYING THE SAME

CROSS-REFERENCE TO RELATED APPLICATION

This is a continuation of copending application Ser. No. 544,978, filed on Oct. 24, 1983, now abandoned which is a continuation-in-part of Ser. No. 238,284, filed Feb. 3, 1981, entitled "Intaglio Printing Ink and Method of Employing Same" of Vincent J. Frilette, which is now abandoned.

BACKGROUND OF THE INVENTION

Printing inks and printing methods may be broadly divided into three major classes which vary considerably in ink composition, method of application, and drying mechanism. Typographic printing is a method of printing from raised characters or plates which are first inked and then pressed against the surface to be printed, thus transferring the ink. The ink must have sufficient viscosity (tack) and adhesion so that it can be evenly distributed on the rollers of the press and be transferred properly from the type or printing plates to the paper or other substrate being printed.

The second major method of printing is lithography which is also known as planographic printing since the process prints from plane surfaces and depends on the fact that grease and water are mutually repellent. If a design is drawn with a greasy substance on a finely-grained metal surface which retains moisture, the lithographic ink will adhere to the design and not the remainder of the plate. In the form of offset lithography, the greasy image is formed on a thin grained metal plate by photographic means and the metal plate is curved and clamped around the plate cylinder of an offset press. Lithographic or offset inks are more viscous than typographic inks and must be substantially resistant to emulsification due to the high speeds developed by offset presses and the resulting high rates of shear. Additionally, the presence of large amounts of volatile solvents in the ink vehicle is undesirable since the solvent will tend to dissolve away the greasy image and cause the plate to go blind. Evaporation of the solvent further gives rise to increased viscosity of the ink which in turn affects the fidelity of printing.

The present invention is concerned with the third major method of printing, i.e., printing by the intaglio process in which, as in all forms of intaglio printing, the design to be printed is etched or engraved below the surface plane of the printing plate. The surface of the plate is then covered with ink to fill in the line or pockets of the etching or engraving and is thereafter wiped so as to not disturb the ink in the etching or engraving. Printing is accomplished by pressing the paper firmly against the plate to transfer the ink from the engraving to the paper. The ink formulation employed for intaglio printing depends upon the type of plate employed and the speed of operation.

One form of using the intaglio process is the engraved steel plate process used in machine printing of currency. The printing of currency from an engraved flat steel or copper plate requires inks that are greaseless, possess short consistencies, and dry by oxidation. Furthermore, since the paper employed is usually dampened, the inks must not bleed or run in water.

Another and extensively used form of the intaglio process is the rotogravure process used to print catalogs, magazines, and supplements to the Sunday newspaper, etc. The term "rotogravure" for this version of the intaglio process stems from the use of rotating rolls (cylinders) as the printing element. The process is often referred to as simply "gravure", and the two terms will be used herein interchangeably.

In rotogravure intaglio inks which are used to print at high speeds from chemically or electronically engraved copper or chromium faced rolls, the wiping of the plate is achieved mechanically by means of a doctor blade. Drying of rotogravure inks is accomplished by evaporation of the solvent. These inks are thin and contain pigments of low specific gravity which are suspended in a vehicle composed mainly of a resin and a solvent.

In the development of printing inks, particularly gravure or solvent inks, printing qualities such as color reproduction, retention of color tone, pigment wetting, and the like, have received special attention. Since gravure inks employ large amounts of volatile solvents for their application, special attention has been directed to avoiding environmental pollution caused by extremely toxic vapors such as from chlorinated hydrocarbons. In addition, gravure inks must be substantially free of particles that might become trapped between the doctor blade and the printing roll and cause continuous streaks to appear. Streaking due to this cause is not uncommon and may be largely corrected by filtering the ink to remove such particles before they become trapped, or by running a pointed bamboo stick under the doctor blade to dislodge the stuck particle.

A particular form of gravure printing is used for reproduction of colored images. Color reproduction by the gravure process, as with other printing processes, requires that the colored image be photographed at least twice and most often four times through appropriate different filters to produce so-called color separations. These color separations, after many photographic steps and incorporation of a suitable screen, are used to produce engraved cylinders, one for each color to be printed.

Although a wide range of hues may be produced with two colors, a more complete range is achieved with the three basic colors generically referred to as yellow, magenta, and cyan, but a black is often added, too. The toners used for rotogravure process inks are substantially transparent, and the printed image is formed by a subtractive process. Thus, the yellow is usually printed first and dried, and the red printed in exact register after the yellow. A beam of white light impinging on the printed paper at this stage of the formation of the print undergoes selective absorption of the blue and green components with reflection of the remainder.

After the cyan is printed, absorption of none, some, or substantially all of the spectral components of white light becomes possible, depending on the distribution of the inks and their densities. Thus, grays and blacks may be formed by three-color printing. However, it is very common practice to add a separate black cylinder and to regard black (also referred to as key) as the fourth color to allow the printer better control of the hues in the reproduction at the time of printing. Thus, four color printing is very commonly used for quality work, but often additional special colors may be used or the type may be printed separately. In skilled hands, these techniques are capable of yielding excellent color reproductions.

The gravure color process, because it requires overprinting one color by another at least once and often four times, makes particular demands on the cleanliness of the ink. The occurrence of streaking in any one of the inks, particularly the black, cyan, or magenta, materially degrades a high quality reproduction and makes it unacceptable. The usual remedies, such as filtering, often correct this problem.

In some instances, however, streaking occurs in gravure printing that is not correctable by simple measures. In at least some instances, such persistent streaking appears to be associated with an adherent deposit on the part of the printing roll that is not etched. In the past, unsuccessful efforts to eliminate streaking have included filtering the ink, changing ink batches, changing ink viscosities, changing ink suppliers, changing solvent blends, changing ink temperature, and repeatedly cleaning up the ink unit. Other efforts have included scrubbing, dechroming and rechroming the cylinder against which the ink rollers press, changing paper and drying temperatures, changing ink formulation, and varying the ink formulation from no wax to a high wax ink content. Even the removal of deposits that jam behind the doctor blade, changing the pressure and angle of the doctor blade, and changing doctor blade material have not satisfactorily eliminated the problem of streaking.

The present invention is concerned with a rotogravure printing ink composition and process in which the ink is applied at ambient temperature and is dried at above ambient temperature, i.e., at a temperature at least 20° F. above ambient. The drying of these gravure printing inks occurs by evaporation of the volatile solvent component consisting essentially of hydrocarbons, oxygenated compounds, or mixtures thereof, each of which at atmospheric pressure has a boiling point below about 150° C. The term "drying" as used herein means the loss of fluidity and stickiness when a film of the ink, not more than one thousandth of an inch thick when coated on glass, is exposed to air for not more than 30 minutes at 72° F.

This invention is particularly concerned with inks for reproducing a colored image by the color rotogravure reproduction process, and such inks are herein designated "process gravure inks", said reproduction being effected by overprinting one color on another at least once. In all cases in which the term "gravure printing ink" is used herein, it is intended to refer to a composition used to reproduce a colored or a black and white image, which image may include text; and, also to a composition that dries by the evaporation of volatile solvent consisting of the components described above. The term "gravure printing ink" as used herein excludes compositions that are applied by a rotogravure apparatus to produce functional coatings, such as a continuous adhesive coating, or carbon paper coating.

It has been general practice not to include non-fugitive antioxidants in printing inks. For inks which dry by oxidation of a drying oil or oleoresinous film, such inclusion prevents drying. But because certain of such compositions may form a skin on storage or when on the press, a minute amount of fugitive antioxidant such as guaiacol (2-methoxyphenol), which boils at 205° C, is sometimes used. Its evaporation after printing allows drying by oxidation to proceed. Since rotogravure inks do not form skins on storage, there has been no reason to incorporate antioxidants.

U.S. Pat. No. 3,375,120 to Remer discloses the use of antioxidants in compositions designed to be applied at the boiling point of the solvent for manufacture of functional coatings. The antioxidant is used to preserve the quality of the functional coatings during long-term storage or during long periods of exposure to outdoor conditions. U.S. Pat. No. 4,077,807 to Kramer et al discloses an ink composition for ball point pens, which is not a gravure ink as defined herein and is devoid of volatile solvent.

SUMMARY OF THE INVENTION

The present invention resides in the discovery that a small amount of an antioxidant can be added to gravure inks to substantially reduce or eliminate the tendency of such inks to cause streaking when employed for printing by the rotogravure process. The antioxidant therefore functions as a means for reducing streaking of the gravure printing ink composition during high-speed printing operations. The amount of antioxidant used ranges from 0.0002 to 1.0 weight percent and is preferably 0.001 to 0.5 weight percent, based on the weight of the total composition.

DESCRIPTION OF THE PREFERRED EMBODIMENTS

Gravure ink compositions are well known and generally comprise a pigment dissolved in an ink vehicle composed of a resin and volatile solvent. The selection of resins for rotogravure inks depends on the solvent and the substrate to be printed and the end use of the printed matter. Detailed examples of over 300 resins used in the manufacture of inks, including gravure types, are set forth in "Synthetic Resins" by Werner Husen, The American Ink Maker, June 1952, page 63. Useful resins include rosin and modified rosins, such as calcium and zinc resinates and variants of these. See also "Synthetic Resins for Inks," John P. Petrone, The American Ink Maker, Vol. 49, Mar.-Oct. 1971. Both of these articles are incorporated herein by reference.

Other resins other than those mentioned above which can be employed are petroleum resins or various modified products of cyclopentadiene resins, examples of which are found in U.S. Pat. No. 3,084,147 and British Pat. No. 1,369,370. These disclosures are also incorporated by reference. Still another modified resin suitable for use in gravure inks is the resin which is prepared by collecting a fraction boiling at 140°-220° C. from a cracking oil which is obtained by thermal cracking of petroleum, polymerizing the fraction using a Friedel-Craft catalyst to give a resin having a softening point of 160° C., reacting the resin with an unsaturated carboxylic acid or its anhydride in an amount of 0-4 moles per 100 gram of the resin, and then esterifying the resulting resin using a monovalent alcohol in an amount of 0-2 moles per mole of the above unsaturated carboxylic acid or anhydride, to give a resin having a softening point of 145° C. The product has a stable viscosity and induces excellent printing. See Japanese Pat. No. 47,994/72.

The resin employed in the gravure ink is used in a vehicle whose solvent constituent may be an aliphatic or an alicyclic hydrocarbon such as hexane, heptane, and cyclohexane. The resin also may be used in aromatic hydrocarbon solvents such as xylene, toluene (e.g., tolusol 25), high flash naphtha, and benzene. The resin must be soluble in the solvent and readily separated therefrom. Since the drying of gravure ink results from evaporation of the solvent, the ink vehicle is basically a resin and solvent. Depending upon the particular combination of resin and solvent, various types of vehicles can be used.

An effective amount of antioxidant for use in the ink composition is to some extent dependent on the choice of antioxidant, the nature of the ink composition, including particular pigment used, and the environmental conditions under which the ink will be stored or exposed in actual use. In general, the antioxidant will be used in an amount ranging from about 0.0002 to 1.0 weight percent, preferably 0.001 to 0.5 weight percent, based on the ink. A particularly preferred range is 0.005 to 0.1 weight percent.

Typical antioxidants which may be employed include, among others: 2,5-ditertiary butyl hydroquinone; hydroquinone monomethyl ether; 4-dodecyloxy2-hydroxybenzophenone; monotertiary butyl hydroquinone; butylated hydroxyanisole; hydroquinone; 2,2-methylene-bis(4-ethyl-6-tert-butyl phenol); octylated diphenyl amine; hydroquinone monobenzyl ether; isopropoxy diphenylamine; aldol alphanaphthylamine; polymerized trimethyl di-hydroquinoline; condensation product of diphenyl amine and acetone; diphenyl-para-phenylenediamine; phenyl beta naphthylamine; isopropoxy diphenylamine; diphenyl para phenylene diamine; 2,6-ditertiary butyl-4-methyl phenol; octodecyl-3-(3',5'ditertiarybutyl-4'-)hydroxy phenol propionate; polymeric hindered phenol; N-acetyl-p-aminophenol; N-butyryl-p-aminophenol; lauryl-p-aminophenol; steryl-p-aminophenol, and the like.

The gravure printing inks of the invention are prepared in a customary manner, with the exception of using the aforementioned antioxidants as an essential component of the vehicle. For example, 100 parts by weight of the resin and 1 part of antioxidant are dissolved in up to 200 parts by weight of a high boiling petroleum solvent, such as a mixture containing 70 weight percent toluene, 4 weight percent xylene and 26 weight percent lactol spirits to prepare the vehicle. Particularly preferred solvents such as this mixture have a Kauri butanol value of about 105 as compared to aliphatic solvents which have a Kauri butanol value of 35-45.

A pigment such as Pthalocyanine Blue, Benzidine Yellow, channel black, Carmine 6B or titanium white is added and the mixture is placed in a ball mill and ground until a uniform dispersion of the pigment in the hydrocarbon solution is obtained. In this manner, it is possible to prepare an ink concentrate which may be subsequently diluted with additional solvent, thus making it appropriate for use in the printing operation. Typically, for instance, an ink composition used in a gravure printing operation may contain between about 0.0002-1.0% of antioxidant, 10% and about 50% of the resin, between about 50 to 100 parts of pigment or colorant per 100 parts of resin, the balance consisting essentially of a mixture of hydrocarbon solvents such as toluene, xylene, and lactol spirits. The viscosity of the ink at the point of use is not more than 5 poises and is preferably between 0.5 and 1.0 poise.

It should be understood that other additives can be added to the printing ink for improvement of printability flow behavior and pigment wetting, for example, in amounts from 1-15 percent by weight (preferably 1-10 percent by weight), calculated on the resin. Waxes, such as ester waxes, amide waxes, and hydrocarbon waxes, can be added in amounts from 0.1-5 percent by weight. Other known additives such as ethyl cellulose or ethyl hydroxy cellulose may be used to promote ink film adhesion, scuff resistance, gloss, etc., providing the additive is compatible with the gravure resin. The printing inks are preferably used without plasticizers, although the latter can be added to achieve special effects.

As substrates, the printable print carriers conventionally used in gravure printing can be used, such as paper, boxboard, and various synthetic films such as polyolefins or cellophane, as well as metal films such as aluminum film.

The following examples illustrate the best mode now contemplated for carrying out the invention.

EXAMPLE 1

Although streaking has always been a costly nuisance throughout the gravure printing industry, it reached a stage of unprecedented severity at a printing plant in Mississippi during the summer of 1980, necessitating a plant shut-down of nearly two months duration. Housekeeping in the press room was excellent, making tramp dirt an unlikely source.

The streaks could not be eliminated by the usual pressroom procedures or, if eliminated, they returned, and the successful procedures of one day might be a total failure the next day. Controlled experiments to generate streaks were unsuccessful so that research investigations were not possible. The binder for the clay coating was analyzed, the cylinders were scrubbed and even re-chromed, the press speed and dryer temperature were changed, rolls of paper and paper suppliers were changed, recovered solvent was replaced with virgin solvent for the ink, cylinders were polished and engraved, representatives were sent by ink suppliers to solve the problem, and the ink formulation and even the wax content of the ink were changed. Nothing solved the problem.

A special meeting on press streaking and cylinder wear problems was held to discuss this streaking problem and similar problems which had always occurred sporadically and had become acute in a number of plants that summer. The 48 registrants, representing printing, ink, paper, impression roll, cylinder, and press manufacturers, concluded that the streaking was caused by small soft particles that jam behind the doctor blade. These particles were extremely difficult or impossible to dissolve in ink solvents and were considered most likely to be at least partially composed of paper fiber or coating material. Another possibility that was suggested was that abrasion resistant, tough ink did not dry properly before reaching the next press unit and then stuck to the next cylinder while picking up some fibers in the process.

Although the results of the discussions appeared to be inconclusive, comments indicated possible involvement of the paper, the ink, chrome treatment, and the operating conditions. No one even considered oxidation as being a factor, apparently because the very rapid evaporation of the solvent and the high travelling speeds of the paper being printed made oxidation seem inconsequential or even impossible to the industry.

EXAMPLES 2-8

Autoxidation rates were measured at 60° C. as described by R. F. Bridger, A. L. Williams, and L. J. McCabe, Industrial and Engineering Chemistry, Product Research and Development, Volume 5, page 226, September 1966.

Autoxidations at 60° C. were conducted in a cylindrical cell of 50 ml capacity, surrounded by a 60° C. water bath. The contents (10 ml) of the reaction cell were agitated with a magnetic stirrer. Reaction rates were independent of oxygen pressure to 300 mm of Hg total pressure and were unaffected by the rate of stirring in the range of 500 to 1600 rpm. Oxygen consumption was measured at constant pressure by manually adjusting the mercury manometer and reading the change in volume from a 10 ml buret surrounded by a 25° C. water bath. Connecting portions of the apparatus were made of 2 mm id capillary tubing. Oxygen consumption rates were expressed as moles of oxygen absorbed per liter of solution per sec. $M s^{-1}$.

The gravure ink was a commercial blue ink, consisting of 47% hydrocarbon solvent and 53% solids, of which 43% was resin and 57% was pigment, believed to be copper phthalocyanine. In the examples shown below, the volume of reactant was 10 ml. In Example 3, the resin (2.3 g) was separated from 10 ml of a solvent solution of resin by rotary evaporation and redissolved in chlorobenzene for the oxidation measurement. In order to minimize errors during measurements of inhibited rates, the ink was oxidized for ca. 6000 seconds without antioxidant, and then the antioxidant was injected via a 100 μL syringe into the reaction medium. The inhibited oxidation rate was taken from the slope of oxygen absorption vs. time after the injection of antioxidant.

As shown below, the data in Table I demonstrates that the rate of oxidation of a commercial blue rotogravure ink that contains a resin, solvent, and Pthalocyanine Blue pigment is substantially reduced by incorporation of antioxidant in the composition.

TABLE I

| Example | Composition | Oxidation Rate × 106 $M s^{-1}$ | Percent Reduction in Oxidation Rate |
|---|---|---|---|
| 2 | Solvent only | 0 | — |
| 3 | Resin equivalent of 10 ml ink, dissolved in chlorobenzene | 0.19 | — |
| 4 | Blue ink | 1.00 | — |
| 5 | Blue ink | 0.97 | — |
| 6 | Blue ink | 0.99 | — |
| Average of Examples 4, 5, and 6 (standard deviation 0.015) | | 0.987 | — |
| 7 | 1000 ppm DBPC in blue ink | 0.26 | 74 |
| 8 | 1000 ppm DTOA in blue ink | 0.62 | 37 |

The inhibitors employed in Table I were 2,6-di-tert-butyl-4-methylphenol, abbreviated DBPC (Example 7), and 4,4'-bis(1,1,3,3-tetramethylbutylphenyl)amine, abbreviated DTOA (Example 8).

EXAMPLE 9

Autoxidation rate studies were made on a total of twenty-three inks, four varnishes, and four solvents. The results showed that these inks oxidized quite rapidly, as indicated for blue inks in Examples 7 and 8. This finding was quite surprising. It was then concluded that:
1. Ink varnishes are highly reactive toward autoxidation.
2. Ink oxidation is catalyzed by pigment.
3. The order of reactivity is blue>black>red>yellow, reactivity of the blue and black being strongly promoted by water.
4. Solvents are unreactive.
5. Oxidative deterioration of inks can be controlled by free radical inhibitors.
6. Synergistic combinations of diarylamine and phenolic inhibitors are more effective than single component antioxidants.

The unsuspected but nevertheless high reactivities of gravure inks toward oxygen led to the conclusion that autoxidation was a primary factor in the appearance of persistent streaking phenomena. The critical stage of reaction could have occurred in the fountain while the ink was exposed to vigorous agitation, during storage in the tank farm, or possibly further back in the supply line. Another possibility is that saturation with oxygen and/or with water during storage or use (streaking being most pronounced during humid summer weather) could have occurred at these times so that the ink became unstable with respect to oxidative conditions and rapidly formed small amounts of streak-producing sludge after filtering. It would accordingly not be surprising that a wide range of experts in the gravure printing industry would have been oblivous to autoxidation possibilities.

What is claimed is:

1. A rotogravure printing ink composition that dries by evaporation of solvent, said composition comprising a pigment dispersed in a fluid vehicle, said vehicle comprising rosin and/or a modified rosin dissolved in a volatile solvent consisting essentially of hydrocarbons, oxygenated compounds, and mixtures thereof, each of which at atmospheric pressure has a boiling point below about 150° C., and about 0.0002 to about 1.0 weight percent antioxidant, said amount being effective to reduce the tendency of said ink to form undesirable streaks on the printed image when said ink is fed from printing fountain maintained at about ambient temperature.

2. The composition of claim 1 wherein said pigment is cyan.

3. The composition of claim 1 wherein said pigment is magenta.

4. The composition of claim 1 wherein said pigment is yellow.

5. The composition of claim 1 wherein said pigment is black.

6. The composition of claim 1 wherein said antioxidant is selected from the group consisting of 2,6 ditertiary butly-4-methyl phenol and octylated diphenylamine.

7. In a process for rotogravure printing by applying at about ambient temperature an ink composition that dries by evaporation of solvent, the improvement, whereby reducing the tendency of said ink to form streaks, which comprises:
using an ink comprising a pigment dispersed in a fluid vehicle, said vehicle comprising rosin and/or a modified rosin dissolved in a volatile solvent consisting essentially of hydrocarbons, oxygenated compounds, and mixtures therof, each of which at atmospheric pressure has a boiling point below about 150° C., and about 0.0002 to about 1.0 weight percent antioxidant, said amount being effective to reduce the tendency of said ink to form undesirable streaks on the printed image.

8. The process described in claim 7 wherein said amount of antioxidant is about 0.001 to about 0.5 weight percent.

9. The process described in claim 8 wherein said pigment is selected from the group consisting of black cyan, magenta and yellow.

10. The process described in claim 7 wherein said rotogravure printing is over printing done on paper bearing a printed image.

11. The process described in claim 9 wherein said rotogravure printing is over printing done on paper bearing a printed image.

12. The process described in claim 7 wherein said antioxidant is 2,6 ditertiary butyl-4-methyl phenol or octylated diphenylamine.

* * * * *